Jan. 29, 1957
R. J. GRAY
2,779,627
PNEUMATIC CONTROL
Filed Oct. 1, 1952
9 Sheets-Sheet 2
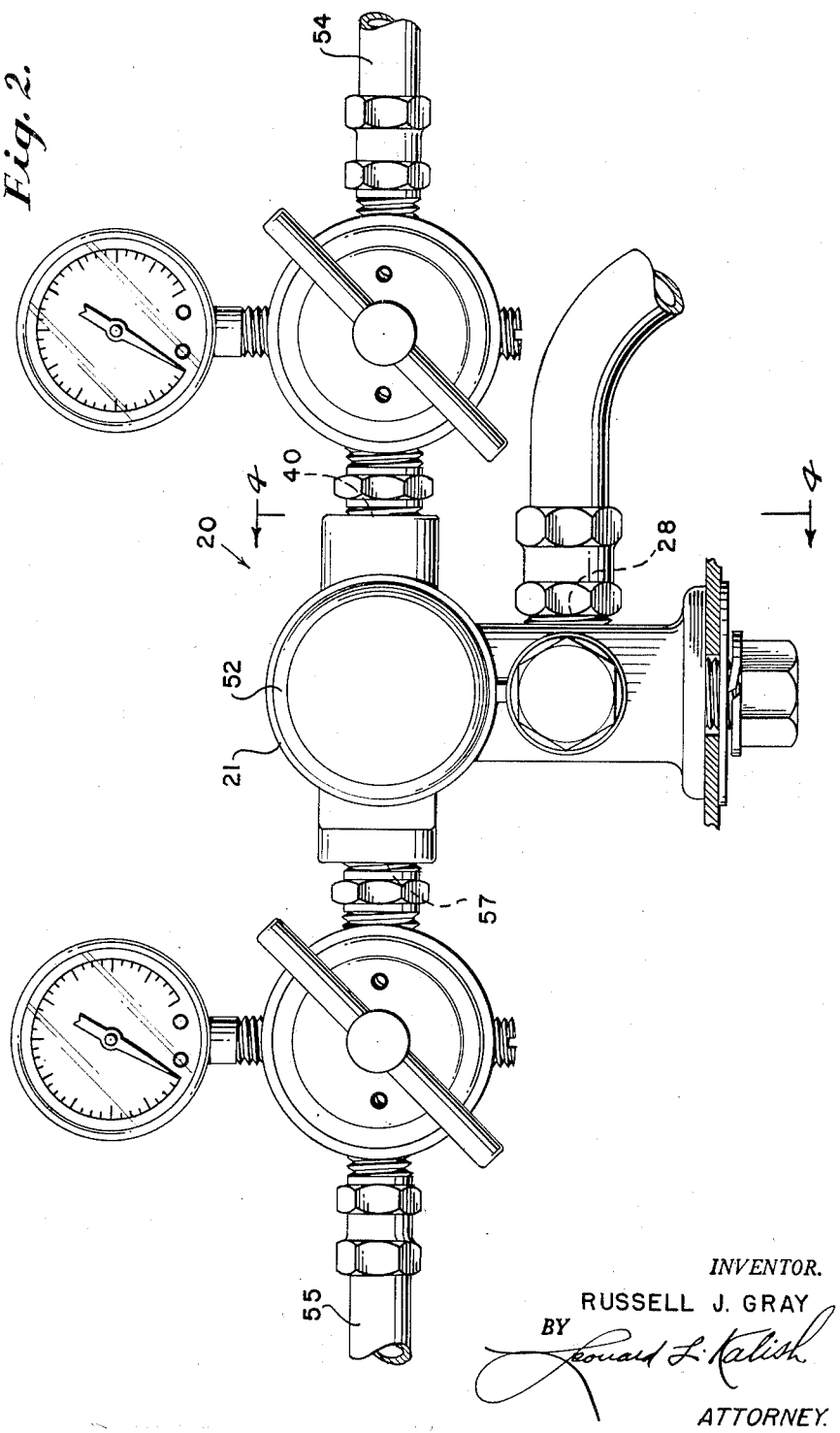
INVENTOR.
RUSSELL J. GRAY
BY
Leonard L. Kalish
ATTORNEY.

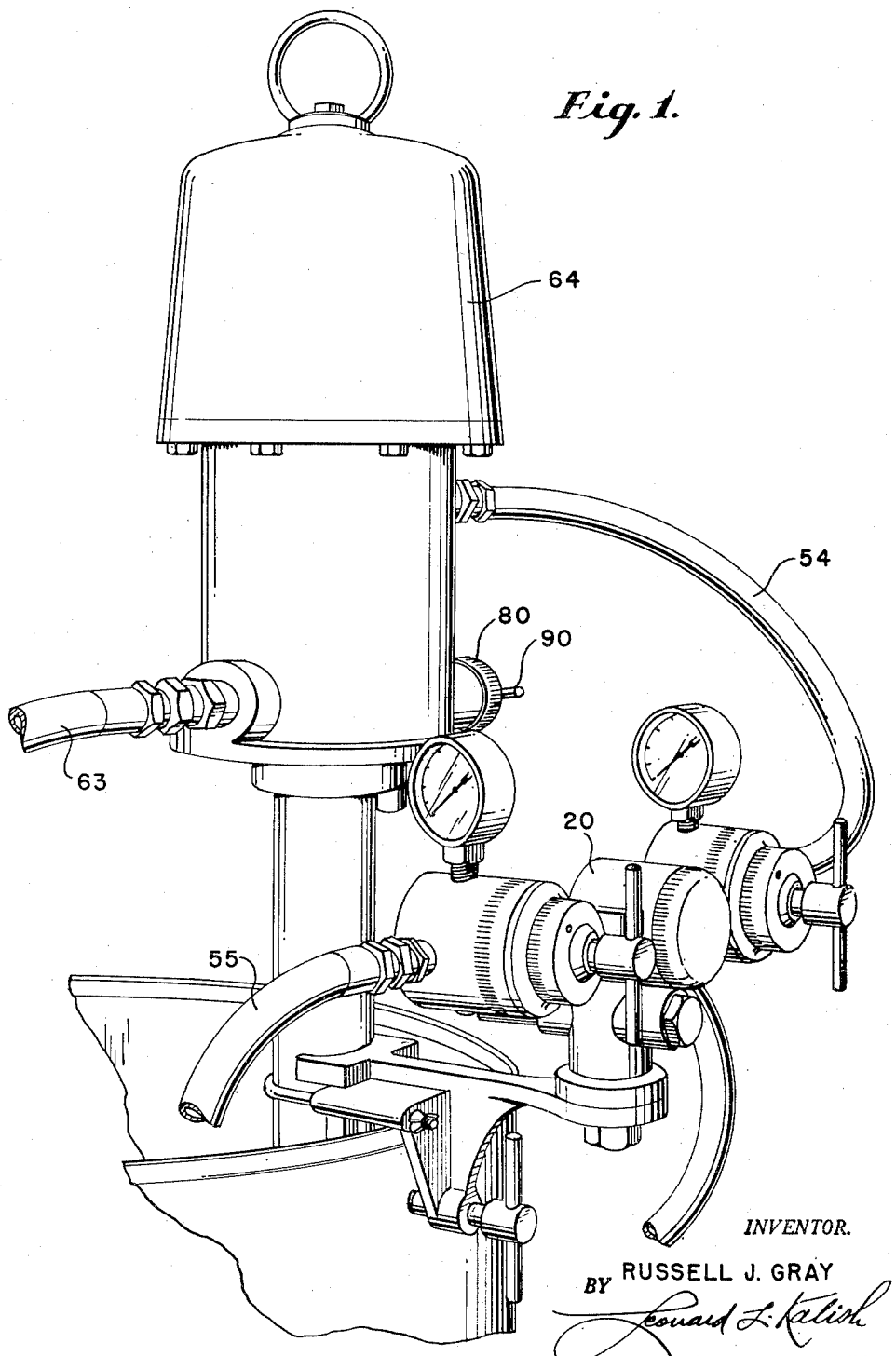

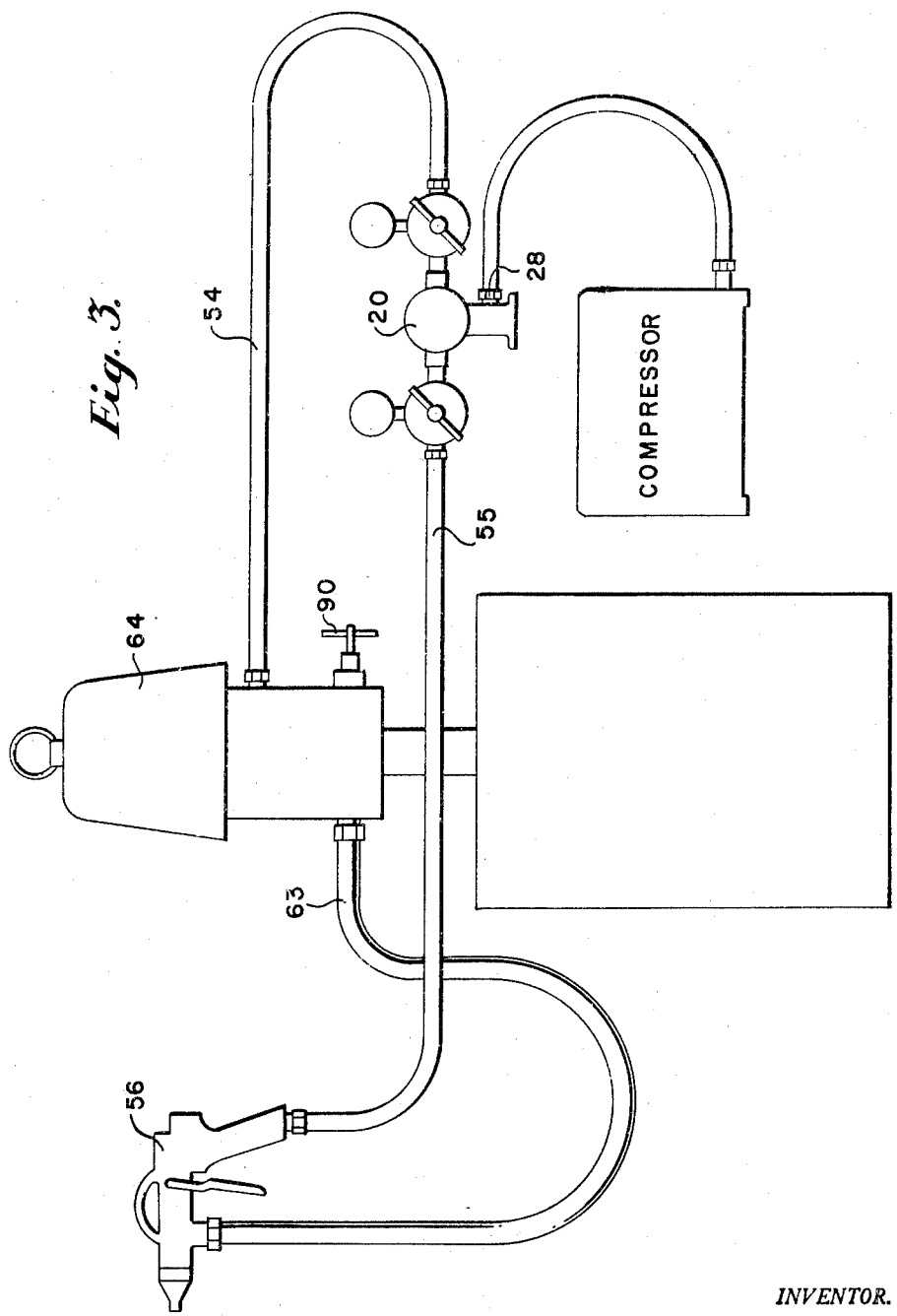

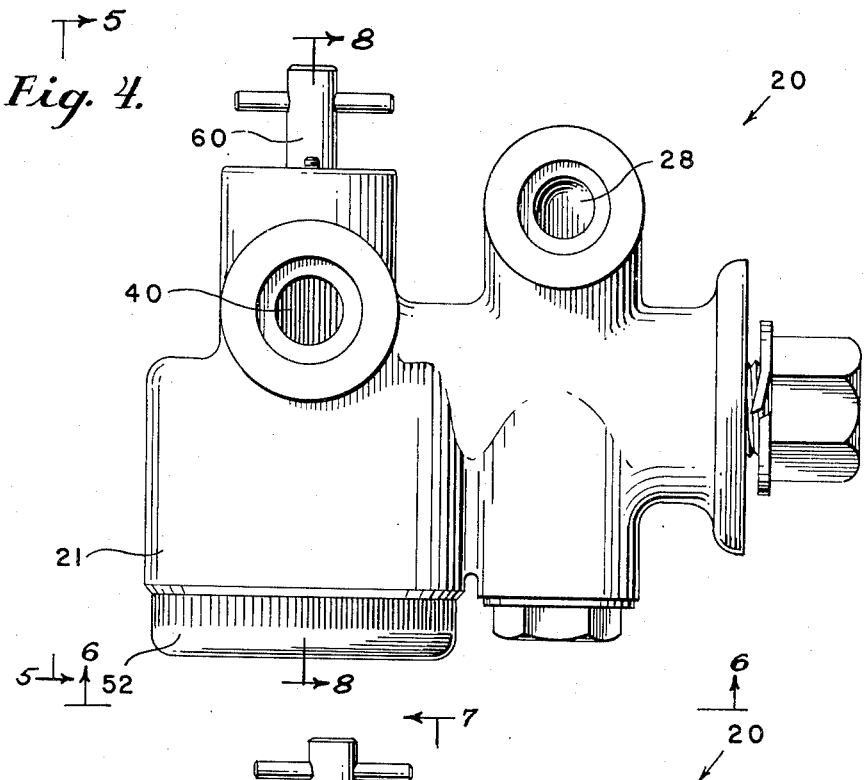
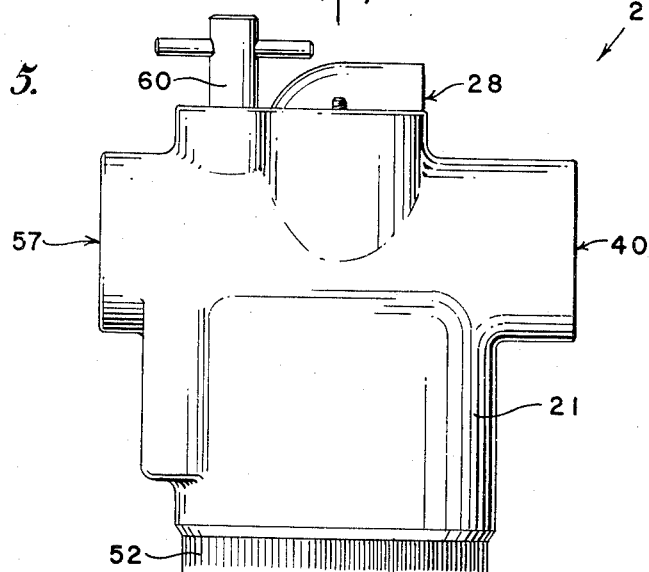

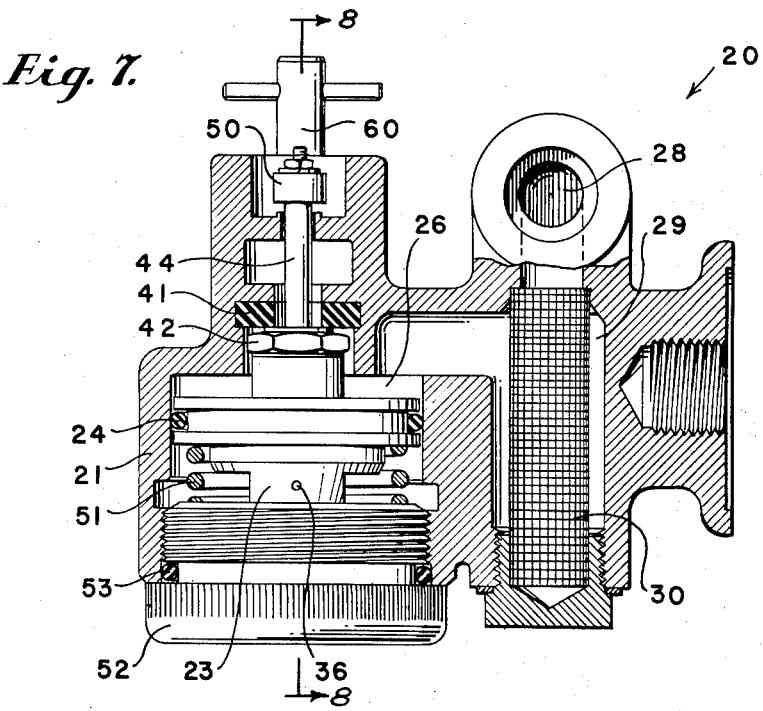
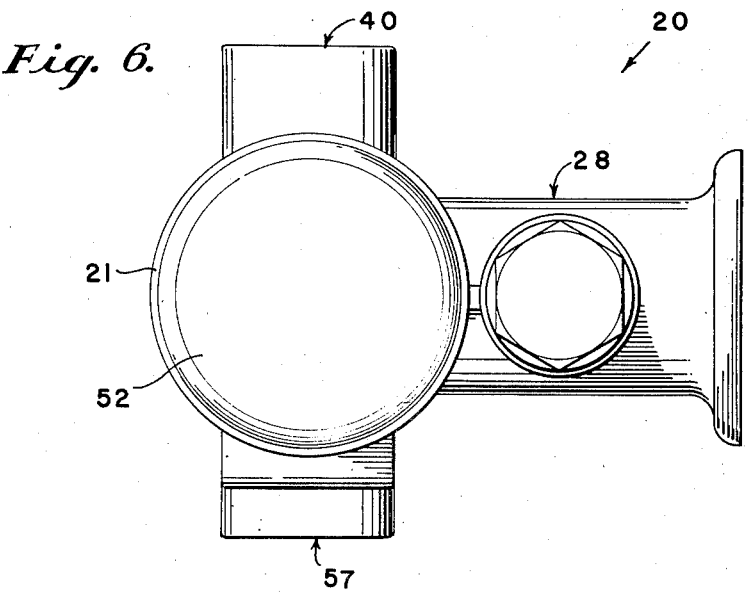

Jan. 29, 1957 R. J. GRAY 2,779,627
PNEUMATIC CONTROL
Filed Oct. 1, 1952 9 Sheets-Sheet 6

INVENTOR.
RUSSELL J. GRAY
BY
Leonard L. Kalish
ATTORNEY.

Jan. 29, 1957    R. J. GRAY    2,779,627
PNEUMATIC CONTROL
Filed Oct. 1, 1952    9 Sheets-Sheet 7

INVENTOR.
RUSSELL J. GRAY
BY
ATTORNEY.

Jan. 29, 1957  R. J. GRAY  2,779,627
PNEUMATIC CONTROL
Filed Oct. 1, 1952  9 Sheets-Sheet 8

INVENTOR.
RUSSELL J. GRAY.
BY
ATTORNEY.

United States Patent Office 2,779,627
Patented Jan. 29, 1957

2,779,627
PNEUMATIC CONTROL
Russell J. Gray, Meadeville, Minn.

Application October 1, 1952, Serial No. 312,613

7 Claims. (Cl. 299—86)

The present invention relates to a new and useful fluid-flow control system, including a flow-controlled valve, for automatically shutting off or turning on compressed air in a line leading to one point of application of such compressed air, responsive to the cessation of flow or the starting of flow of the same compressed-air supply to another point of application; and including an automatic fluid-relief valve air-actuated to control fluid-pressure in a supply line (delivering fluid to the aforesaid point of application) simultaneously with the shutting off or turning on of the aforesaid compressed-air supply.

The present invention has as one of its objectives the automatic shutting off and turning on of compressed-air delivered to the air-motor of an air-powered liquid-supply-pump; the liquid discharge of said pump being delivered to an air-operated liquid-dispersing type of spray-gun by the aforesaid pump, responsive to the cessation of flow or the commencement of flow of compressed-air to the same spray-gun (for the application or the spraying of the liquid delivered thereto by the aforesaid pump).

In the air-sprayed application of generally viscous liquids such as roofing compounds, rust and corrosion preventatives, caulking compounds, adhesives, undercoatings, plaster, sound deadeners, paints and the like, the viscous liquid is delivered to the spray-head or spray-gun or nozzle by an air-powered liquid-pump, and through another line compressed air is delivered to the same spray head, spray gun or nozzle, and in such spray gun both the compressed air and the liquid under pressure are combined and controlled by a manually operated valve or valves connected to a common trigger or handle; the compressed air serving to atomize or disperse the liquid and to propel it towards the surface to which it is to be applied. Air-powered liquid-pumps of this character have generally been of the type in which the liquid-pressure at the discharge port was maintained by the air-powered pump more or less constantly, even though there was no dispersal or discharge of liquid at the spray head, namely, even though the valve in the spray head was shut off. Therefore, when the flow of liquid through the spray head was initiated again by actuating the control valve, an excessive amount of liquid would be discharged, at the outset, before the compressed air could be applied to the liquid flow to effect the desired dispersion. This would have the effect of delivering a blob of the viscous liquid to the surface in an uneven manner, each time the spray was started.

One object of the present invention is automatically to shut off the compressed air delivered to the air-powered pump whenever the flow of air to the spray nozzle is stopped, that is, whenever the spraying operation is stopped, so as thereby to relieve the pressure on the liquid. Another object is automatically to turn on the compressed air to the air-powered pump with the first call of air or first flow of air through the spray nozzle, thus quickly building up fluid pressure as the compressed air issues from the spray nozzle and thus quickly supplying liquid undr pressure to the nozzle to be dispersed by the air.

Another object of the present invention is to exhaust the air in the compressed-air line leading to the air-powered pump, simultaneously with the shutting off of the compressed air supply thereto, so that the compressed air in the line between the automatic valve and the air-powered motor may not, in and of itself, maintain pressure on the liquid supply between pump and spray nozzle.

Another object of the present invention is to relieve the air pressure in the pump-operating air-line of a spray-system for semi-fluid or viscous materials, simultaneous with the relief of fluid-pressure in the pump-discharge-line, instantaneously with the shutting-off of the air-supply at the spray-head or atomizer at the discharge end of the fluid-supply line, without exhausting the air-supply line to said atomizer.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the drawings wherein like reference characters represent like parts:

Figure 1 represents a perspective view of the fluid control system of the present invention.

Figure 2 represents a front elevational view of the flow control valve of the present invention with pressure regulating valves operatively connected thereto.

Figure 3 represents a schematic view of the fluid control system of the present invention.

Figure 4 represents a side, elevational view of the flow control valve taken generally along line 4—4 of Figure 2.

Figure 5 represents an end elevational view of the flow control valve taken generally along line 5—5 of Figure 4.

Figure 6 represents a bottom view of the flow control valve taken generally along line 6—6 of Figure 4.

Figure 7 represents a vertical cross-sectional view taken generally along line 7—7 of Figure 5.

Figure 8:
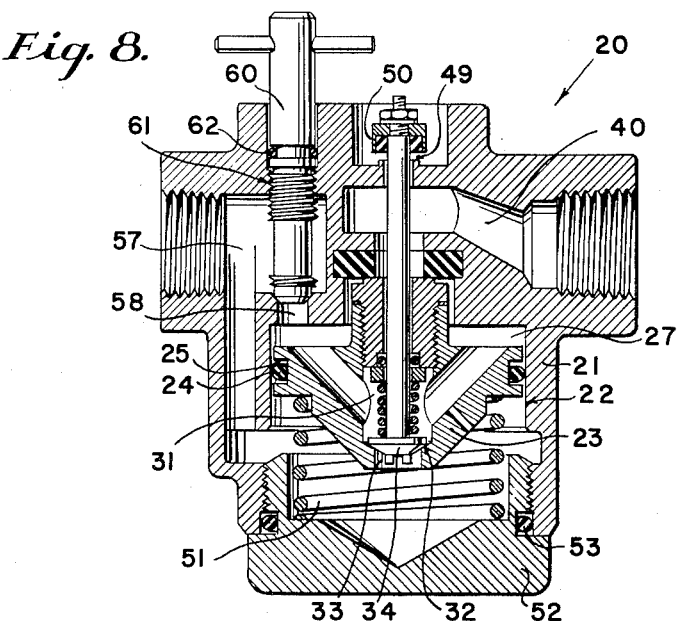
Figure 8 represents a vertical cross-sectional view taken generally along lines 8—8 of Figures 4 and 7.
Figure 9:
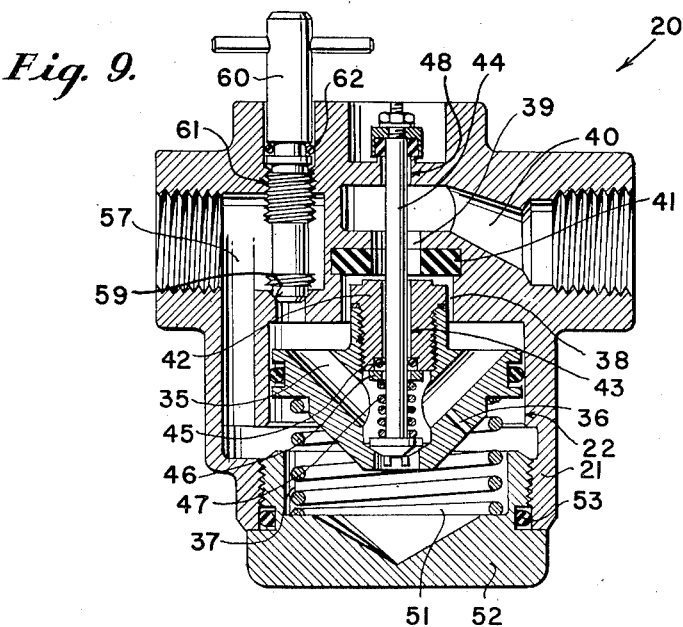
Figure 9 represents a vertical cross-sectional view similar to Figure 8 but illustrating the valve in a partly-opened condition.
Figure 10:
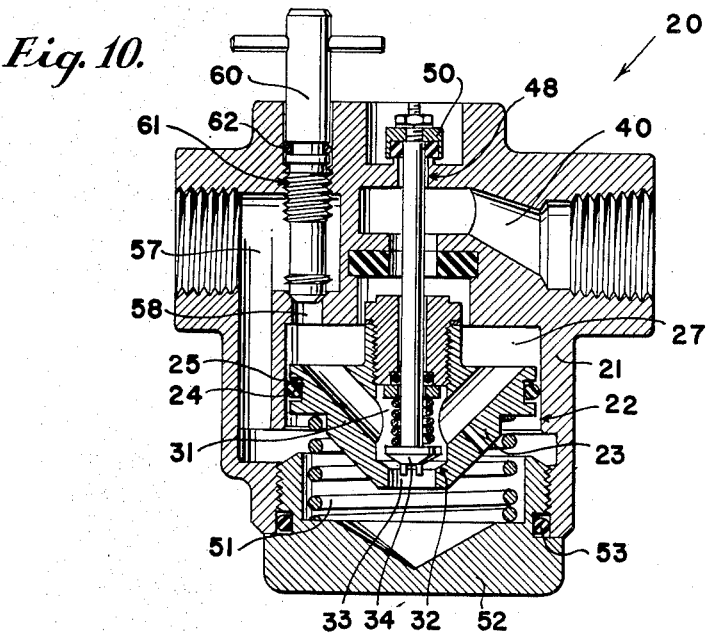
Figure 10 represents a vertical cross-sectional view similar to Figures 8 and 9 but illustrating the valve in a more fully-opened condition.
Figure 11:
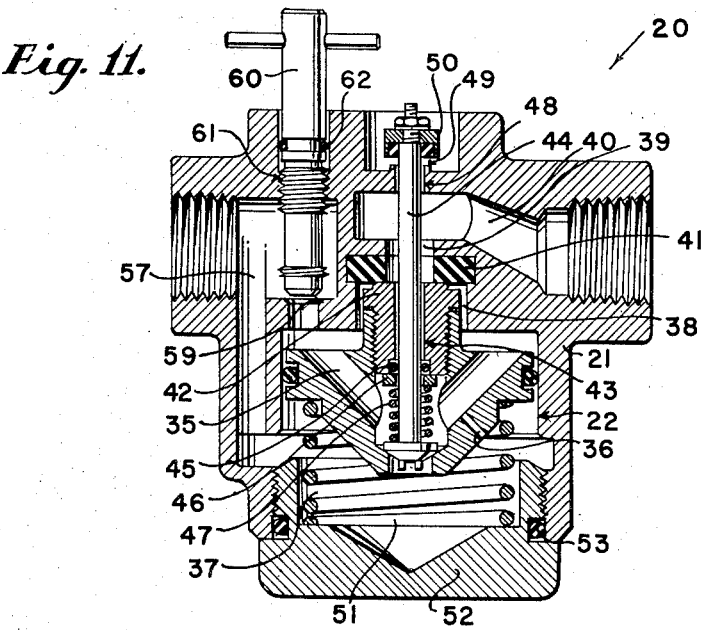
Figure 11 represents a vertical cross-sectional view similar to Figures 8 to 10 but illustrating the valve with the manually-operated auxiliary port opened.
Figure 12:
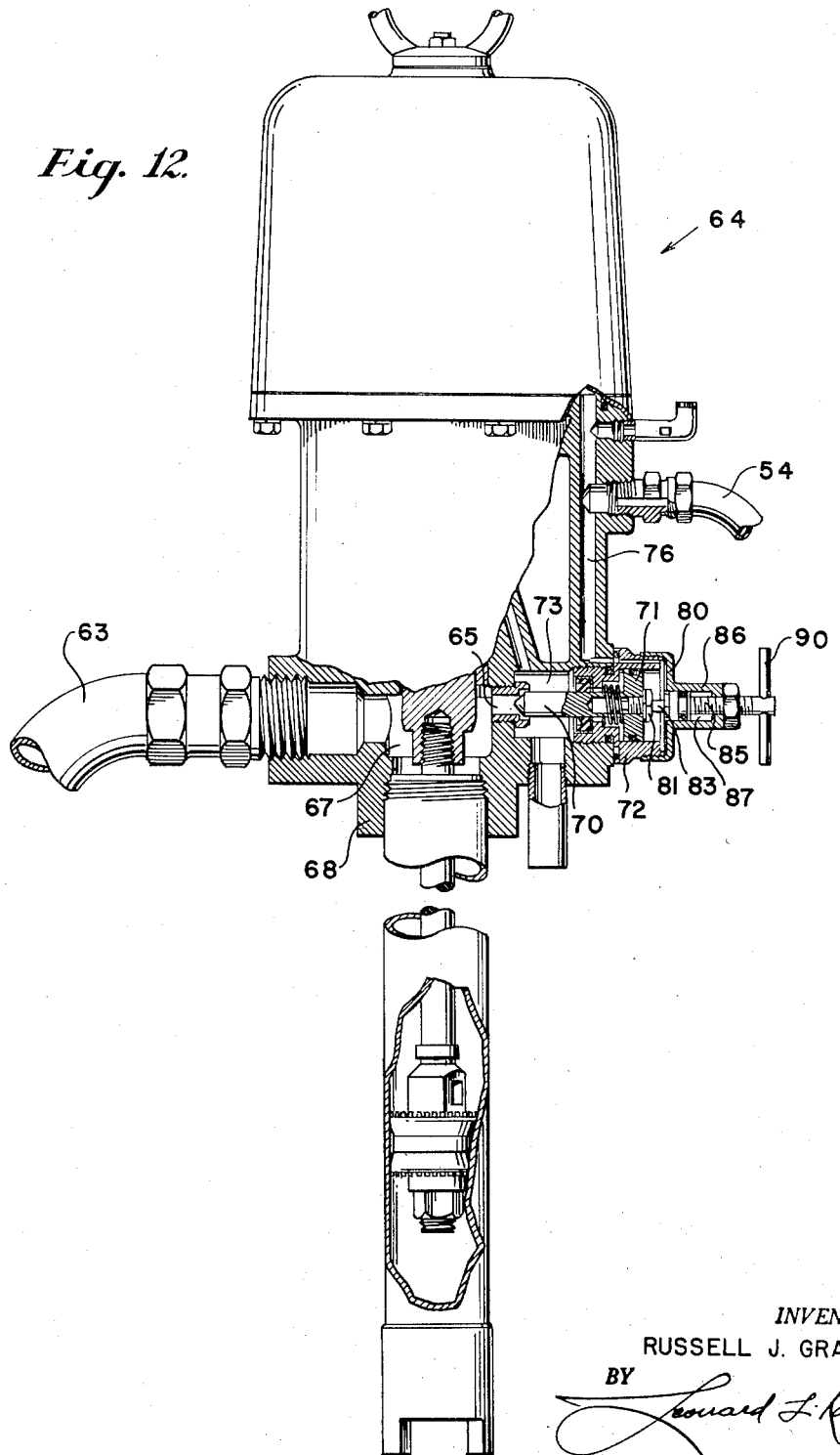
Figure 12 represents a side elevational view of the pump of the present invention, partly in section, to illustrate details thereof.
Figure 13:
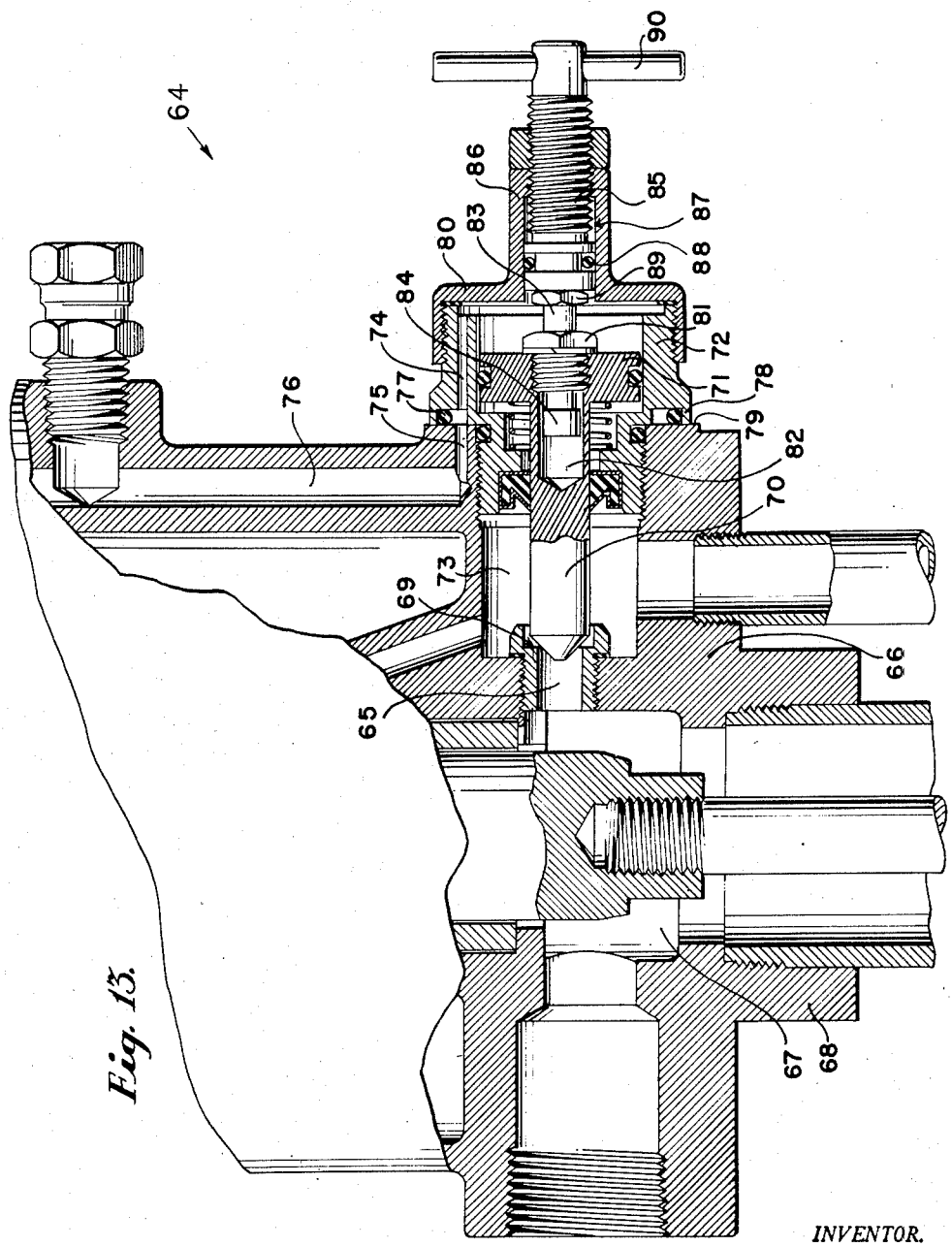
Figure 13 represents a fragmentary vertical cross-sectional view of the pump of the present invention showing in greater detail the relief valve thereof.

In the fluid-flow control-system of the present invention, a flow-controlled valve 20 has a housing 21 having a piston chamber 22 therein, in which a piston 23 is slidably mounted, in fluid-sealed relation, as for instance by the O-ring 24 disposed in a ring receiving groove 25 thereof.

Through an air-inlet port 26 compressed air is supplied directly from a compressed-air-supply such as compressor or tank (not illustrated), to one end 27 of the piston-chamber 22. The port 26 may communicate with the air-hose or air-pipe connection 28 through a filter chamber 29 in which an air filter 30 is disposed to filter any foreign matter out of the air.

The piston 23 has a central axial hole or valve chamber 31 therein, which in turn has a valve seat 32, surrounding the port 33 thereof, which is opened and closed by the unseating and seating of the valve 34 from and onto the valve seat 32. A plurality of radially-extending inclined holes 35 lead from the intake side of the piston 23 into the valve chamber 31 so as to permit movement of air from the intake side of the piston to the valve chamber 31 and thence through the port 33 when the valve 34 is unseated.

The piston 23 also is provided with a fixed port 36 providing a passageway and communication between the intake side 27 of the piston and the outlet side or end 37 of the piston-chamber 22; the port 36 being of relatively small diameter so that but a very small amount of air may flow through it at any time.

A valve chamber 38 is provided at the inlet end 27 of the piston chamber 22; said valve chamber having a port 39 therein, communicating with a passageway 40 through which air is supplied to the air-powered liquid-pump 64.

A valve seat 41 surrounds the port 39; the valve seat 41 being either metal or synthetic rubber, as shown in the drawings.

A valve member 42 is coaxially secured to the upper end of the piston 23, and is disposed within the valve-chamber 38, as is shown in the drawings. The valve 42 is adapted to seat against the valve seat 41 whereby to shut off the flow of air from the valve-chamber 38 and the intake side 27 of the piston chamber 22 to the pump-supply passageway 40 of the housing 21.

The valve member 42 is provided with an axial passageway 43 through which the slidable valve stem 44 is adapted freely to pass. The valve 34 is secured to the inner end of the valve stem 44 (by a nut or otherwise). The valve stem 44 passes through the axial opening 43 in the valve member 42 with just sufficient clearance for free sliding movement therethrough, and is preferably sealed in relation to the valve member 42 by an O-type sealing ring 45 closely surrounding the valve stem 44, and recessed in a concentric recess in the end of the valve member 42, and held therein by the washer 46 which is, in turn, held in place at all times by the helical compression spring 47 which is interposed between the washer 46 and the valve member 34 and serves to urge the valve stem 44 and the valve member 34 toward the valve seat 32 in the piston 23.

The valve stem 44 passes through the valve seat 41 and the port 39 with ample clearance, so as to permit the free passage of adequate volume of air through said port, sufficient at all times to supply the air motor of the air-powered liquid-pump 64 (when the valve 42 is unseated from the valve seat 41).

A venting port 48 is provided from the pump-supply air-passageway 40 to the atmosphere, and the valve stem 44 passes through this port, with sufficient peripheral clearance to permit an adequate flow of air there-through when the valve controlling said port is open. A valve seat 49 is provided on the outer side of this venting port 48, and a valve member 50 is secured to the outer end of the valve stem 44 in such spaced relation to the valve seat 49 that said valve 50 will be unseated from the valve seat 49 only when the valve 34 is seated upon its seat 32 and the piston 23 has traveled almost to the limit of its travel in the direction of the inlet end 27 of the piston chamber 22; that is, that it will be unseated only a short distance before the valve 42 has seated upon its seat 41.

A helical compression spring 51 is interposed between the piston 23 and a closure 52, which closure is screw-threaded into the housing 21 and sealed by gasket 53.

The air motor of the pump 64 is connected to the passageway 40, by the air-line 54 while the air-line 55 leading to the spray nozzle or spray gun 56 is connected to the passageway 57 which communicates with the outlet side 37 of the piston-chamber 22. When there is no flow of air out through the passageway 57 (because the spray gun 56 is shut off) the pressure on the inlet side 27 and the outlet side 37 of the piston 23 is equalized through the equalizing port 36, and in this condition the spring 51 moves the entire piston 23 toward the inlet side 27 and, in so doing, brings the valve-seat 32 into contact with the valve 34. Having thus engaged the valve 34, further movement of the piston 23, under the influence of the spring 51, simultaneously moves both the pump control valve 42 and the pump venting valve 50 connected thereto by the valve stem 44. The valve stem 44 is of a length which permits the unseating of the valve 50 before the valve 42 is closed. By this means the flow of air through the port 39 to the air motor of the pump 64 is stopped, while the air accumulated in the line 64 between the valve 42 and the air motor of the pump 64 is fully vented to the atmosphere through the port 49. This condition persists until air flow is started through the passageway 57 to the spray head or spray gun 56 by operation of the spray-gun controls. As the compressed air flows through the passageway 57 and the hose 55, the pressure on the outlet side 37 of the piston 23 drops, thus creating a pressure differential between the outlet side 37 and the inlet side 27 of the piston 23; the pressure on the inlet side being the greater, and this greater pressure on the inlet side overcomes the force of the spring 51 and moves the piston 23 to the limit of its stroke toward the outlet side 37 of the piston. As the piston 23 moves downward, the valve 34 remains upon its seat 32 (kept there by the spring 47) while the pump control valve 42 leaves its valve seat 41 and almost simultaneously, although perhaps slightly later, the venting valve 50 engages the valve seat 49, thereby supplying air to the air motor of the pump so as to bring it into operation. The further movement of the piston 23, against the spring 51, then unseats the valve 34 from the valve seat 32, because further movement of the valve stem 44 in the direction of the movement of the piston, is prevented by the engagement of the valve 50 with the valve seat 49. This, therefore, opens the valve port 33 to permit the free flow of air, in adequate amount through the passageway 57 to the spray gun 56.

In installations where the line 55 to the spray gun 56 is relatively long, and the equalizing port 36 or the main port 33 too small to supply an adequate flow of air to the spray gun, an auxiliary port 58 is provided between the inlet side 27 of the piston chamber 22 to the passageway 57 (the port 58 being provided with a valve seat 59) which port 58 is controlled by a manually adjustable valve 60 screw-threadedly secured in the housing 21 as at 61, with an air-sealing O-ring 62 in a peripheral groove thereof to prevent the passage of air between the housing 21 and valve 60.

By opening the valve 60 slightly, a fuller flow of air may be assured to the spray head 56. In this manner the pressure differential between the intake side 27 and the outlet side 37 of the piston chamber 22 is reduced somewhat, but still is sufficient to overcome the force of the spring 51; the valve 60, when used, being adusted so as to retain a sufficient pressure differential while yet permitting an adequate flow of compressed air to the spray gun 56.

When the spray gun 56 is a substantial distance from the control valve 20, a time lag is encountered after the spray gun is closed for the pressure-equalization between the two sides of the piston 23. To reduce this time lag, the valve 60 may be kept open slightly so that the compressed air accumulated in the hose line 55 leading from the passageway 57 to the spray gun 56 may be more rapidly balanced on the intake side 27 of the piston chamber 22; the opening of the valve 60 being adjusted, however, to a point where a sufficient pressure differential is maintained between the two sides of the piston 23 while air is flowing to the spray gun.

In the preferred embodiment of the present invention, the shutting off of the compressed air to the air motor of the pump 64 and the venting of the air line 54 leading thereto, is accompanied by the relief of pressure in the liquid line 63 leading from the pump 64 to the spray gun 56.

The relief of liquid-pressure in the hose 63 is highly desirable, when the spray gun 56 is shut off so as to dissipate the excess material and to relieve the pressure built up within the line 63 (which is generally a resilient hose-member). When the system illustrated in Figure 3 is in operation, with the spray gun 56 open, the fluid-pressure at the end of the hose 63 which is attached to the pump 64 is appreciably greater than the fluid-pressure in the same hose 63 at the opposite end, where it is connected to the spray gun 56. For example, this pressure-differential between the two ends of the fluid hose 63 may be in the neighborhood of approximately 800 pounds to 35 pounds. Inasmuch as the fluid line 63 is a resilient conduit, it has a tendency to expand under pressure and carry more fluid, or viscous material, than it will when relaxed. When the spray gun 56 is shut off the pressure within the hose 63, between its opposite end, equalizes with the result that there is excessive pressure at the spray gun 56 and consequently the next time the spray gun is operated the excess pressure delivers a blob of fluid or viscous material through the gun. By relieving the excessive pressure at the inlet end of the hose 63 when the spray gun 56 is shut off the "blobbing" condition is eliminated with the hose, however, remaining full of fluid so that the material will flow instantly from the spray gun when the system is actuated by operation of the gun 56.

Relief of the hose-line 63 is accomplished by providing a liquid-relief port 65, in the wall 66 of the discharge end 67 of the pump housing 68, and providing a valve seat 69 around said relief port 65, and an air-seated valve 70 seating against said valve seat 69 whenever air pressure is supplied to the air motor of the pump. The valve 70 has a piston 71 at its rear end, which piston is slidably mounted in a cylinder 72 which may be detachably or otherwise secured to the relief chamber 73 of the housing 68.

An air passageway 74 is provided through the wall of the cylinder 72, parallel to the axis thereof, and a similar passageway 75 is provided through the housing 68, communicating with the air passageway 76 thereof. A sealing gasket 77, intervening the flange 78 of the cylinder 72 and the surface 79 of the housing 68, serves to create an air-tight seal between the cylinder 72 and said housing 68, around the passageways 74 and 75, so that free communication is maintained between said passageways.

A cap 80 closes the outer end of the cylinder 72, axially beyond and clear of the passageway 74 to permit the ingress of air through the passageways 76, 75 and 74 to the rear or outer end of the piston 71.

An axially apertured gland 81 is screw-threaded into a blind bore 82 in the piston 71, and through the central aperture thereof a control member 83 is slidably extended, having an inner head 84 and an outer screw-threaded stem 85. A control handle 90 is screw-threadedly mounted in the tubular extension 86 of the cap 80, and sealed to the inner cylindrical bore 87 thereof by means of an O-ring 88 provided in an annular groove of the unthreaded portion of the handle 90. A lock nut 89 serves to lock the stem 85 to the handle 90. When the stem 83 is advanced toward the piston 71 by rotating the handle 90, the valve 70 is caused immovably to seat on the valve-seat 69, irrespective of the decrease of the air pressure in the line 54 and behind the piston 71 caused by operation of the flow-controlled valve 20. Retraction of the stem 83 by means of the handle 90 withdraws the piston 71 and valve 70, so as to open the port 65, notwithstanding the presence of air under pressure in the passageways 76, 75 and 74 and behind the piston 71; this opening of the port 65 being, however, controllable to any degree desired by means of the screw-threaded adjustment of the handle 90.

With the control member 83 set in mid-position (half way between the open and closed position) by the stem 85 and handle 90, the piston 71 and the valve 70 are free to move forward onto the valve seat 69, thereby closing the liquid relief-port 65, when compressed air is supplied to the pump. The piston 71 and valve 70 are also free to move outwardly, opening the liquid relief port 65 when the air-supply to the pump is shut off and exhausted to the atmosphere. The effective ratio of the area of the piston 71 to the area of the valve-seat 69 is such that the air-operated piston will hold the valve shut against the higher fluid pressures developed by the pump.

If it is desired to circulate the fluid material within the supply drum for mixing purposes or otherwise, the valve 70 may be unseated by operating the handle 90 and the port 65 thus held open to any desired extent while the pump is in operation. Conversely, if it is undesirable to dump the fluid from the line 63 connecting the pump 64 to the spray gun 56, then the valve 70 may be closed and held against the valve-seat 69 by means of the valve stem 83 and handle 90, so that when the compressed-air supply leading to the pump is cut off, and the air vented from the line 55, the valve 70 will nevertheless remain closed.

The present invention is fully operative without the use of electricity adjacent the control valve, spray gun, pump and/or container, and thus eliminates any hazards attendant the use of electricity when dispensing inflammable or volatile substances.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention what I claim as new and desire to protect by Letters Patent is the following:

1. A pneumatic control for operative connection with and use intermediate (a) a source of compressed air, (b) a liquid sprayer which disperses liquid with the aid and under the influence of compressed air applied to the liquid leaving the sprayer and including an air-controlled valve for controlling the flow of compressed air therethrough, and (c) the air motor of an air-powered liquid pump for delivering liquid to said sprayer, said pneumatic control including a housing having a piston-receiving cylinder-chamber therein, a piston within said chamber and reciprocable therein, an air inlet through said housing, entering said cylinder chamber on one side of said piston, a spring in said housing operatively juxtaposed to said piston and constantly urging said piston towards the air inlet end of the cylinder chamber in all positions of said piston, an air outlet for connection with the air inlet of said liquid sprayer, said sprayer air-outlet being in free communication with said cylinder chamber on the side of said piston opposite to the air-inlet side thereof, an air outlet for connection with the air motor of said air-powered liquid pump adapted to supply liquid to said sprayer, a motor-supply valve port intermediate said motor-air outlet and said air inlet, a movable valve in operative juxtaposition to said motor-supply valve port and operatively connected with and operable by said piston for controlling the passage of compressed air from said inlet to said motor-air outlet, a sprayer-supply valve port intermediate the portion of the cylinder chamber which is on the air-inlet side of the piston and the portion of the cylinder chamber on the other side of said piston, and a valve in operative juxtaposition to said sprayer-supply valve port and operatively connected with and operable by said piston for controlling the passage of air from said air inlet to said sprayer outlet past said piston, a restricted bleeder passage intermediate the air inlet portion of said cylinder chamber and said sprayer outlet, a motor-venting valve port between said motor-air outlet and the atmosphere, and a valve in operative juxtaposition to said motor-venting valve port and operatively connected with and operable by said piston to control the flow of air therethrough, said motor-supply valve and said sprayer-supply valve being closed and said motor-vent valve being opened by said piston when the air-control valve of said liquid sprayer is closed, and said motor-supply valve and sprayer-supply valve being opened and said motor-vent valve being closed when the air-control valve of the sprayer is open.

2. A pneumatic control for operative connection with and use intermediate (a) a source of compressed air, (b) a liquid sprayer which disperses liquid with the aid and under the influence of compressed air applied to the liquid leaving the sprayer and including an air-controlled valve for controlling the flow of compressed air therethrough, and (c) the air motor of an air-powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, a spring in said housing operatively juxtaposed to said divider and constantly urging said divider towards said air inlet in all positions of said divider, an air outlet for connection with the air inlet of said liquid sprayer, said sprayer-air outlet being in free communication with said chamber on the side of said divider opposite to the air-inlet side thereof, an air outlet for connection with the air motor of said air-powered liquid pump adapted to supply liquid to said sprayer, a motor-supply valve port intermediate said motor-air outlet and said air inlet, a movable valve in operative juxtaposition to said motor-supply valve port and operatively connected with and operable by said divider for controlling the passage of compressed air from said inlet to said motor-air outlet, a sprayer-supply valve port intermediate the portion of the chamber which is on the air-inlet side of the divider and the portion of the chamber on the other side of said divider, and a valve in operative juxtaposition to said sprayer-supply valve port and operatively connected with and operable by said divider for controlling the passage of air from said air inlet to said sprayer outlet past said divider, a restricted bleeder passage intermediate the air-inlet portion of said chamber and said sprayer outlet, a motor-venting valve port between said motor outlet and the atmosphere, and a valve in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of said sprayer is closed, and said motor-air supply valve and sprayer-supply valve being opened and said motor-vent valve being closed by said divider when the air-control valve of said sprayer is open.

3. A pneumatic control for operative connection with and use intermediate (a) a source of compressed air, (b) a liquid sprayer which disperses liquid with the aid and under the influence of compressed air applied to the liquid leaving the sprayer and including an air-control valve for controlling flow of compressed air therethrough, and (c) the air motor of an air powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, a spring operatively juxtaposed to said divider and constantly urging said divider towards said air inlet in all positions of said divider, an air outlet from said chamber for connection with the air inlet of said sprayer, said sprayer-air outlet being in free communication with said chamber on the side of said divider opposite to the air-inlet side thereof and its zone of entrance into said chamber being so disposed in relation to the limit of travel of said divider that the position of said divider can never have any substantial effect in slowing down passage of air through said sprayer-air outlet by overlapping said outlet, an air outlet for connection with the air motor of said air powered liquid pump adapted to supply liquid to said sprayer, a motor-supply valve port intermediate said motor-air outlet and said air inlet, a movable valve in operative juxtaposition to said motor-supply valve port and operatively connected with and operable by said divider for controlling the passage of compressed air from said inlet to said motor-air outlet, a sprayer supply valve port intermediate the portion of said chamber which is on the air-inlet side of the divider and the portion of said chamber on the other side of said divider, and a valve in operative juxtaposition to said sprayer-supply valve port and operatively connected with and operable by said divider for controlling the passage of air from said air inlet to said sprayer outlet, past said divider, a restricted bleeder passage intermediate the air-inlet portion of said chamber and said sprayer outlet, a motor-venting valve port between said motor-air outlet and the atmosphere, and a valve in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of said sprayer is closed, and said motor-supply valve and sprayer-supply valve being opened and said motor-vent valve being closed by said divider when the air-control valve of said sprayer is open.

4. A pneumatic control for operative connection with and use intermediate (a) a source of compressed air, (b) a liquid-sprayer which disperses liquid with the aid and under the influence of compressed air applied to the liquid leaving the sprayer and including an air-controlled valve for controlling the flow of compressed air therethrough, and (c) the air-motor of an air-powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, an air outlet from said chamber for connection with the air inlet of said sprayer, said sprayer-air outlet being in free communication with said chamber on the side of said divider opposite to the air-inlet side thereof, an air outlet for connection with an air motor of said air-powered liquid pump adapted to supply liquid to said sprayer, a motor-supply valve port intermediate said motor-air outlet and said air inlet, a movable valve element in operative juxtaposition to said motor-supply valve port and operatively connected with and operable by said divider for controlling the passage of compressed air from said inlet to said motor-air outlet, a sprayer-supply valve port in and through said divider, intermediate the portion of said chamber which is on the air-inlet side of the divider and the portion of said chamber on the other side of said divider, and a valve element carried by said divider in operative juxtaposition to said sprayer-supply valve port and operable by the movement of said divider for controlling the passage of air from said air inlet to said sprayer outlet, through said divider, a restricted bleeder passage intermediate the air-inlet portion of said chamber and said sprayer outlet, a motor-venting valve port between said motor-air outlet and the atmosphere, and a valve in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of said sprayer is closed, and said motor-supply valve and sprayer-supply valve being opened and said motor-vent valve being closed by said divider when the air-control valve of said sprayer is open.

5. A pneumatic control for operative connection with and use intermediate (a) a source of compressed air, (b) a liquid sprayer which disperses liquid with the aid and under the influence of compressed air applied to the liquid leaving the sprayer and including an air-controlled valve for controlling the flow of compressed air therethrough, and (c) the air motor of an air-powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, an air outlet from said chamber for connection with the air inlet of said sprayer, said sprayer-air outlet being in free communication with said chamber on the side of said divider opposite to the air inlet side thereof, an air outlet for connection with an air motor of said air-powered liquid pump adapted to supply liquid to said sprayer, a motor-supply valve port intermediate said motor-air outlet and said air inlet, a movable valve element in operative juxtaposition to said motor-supply valve port and operatively connected with and operable by said divider for controlling the passage of compressed air from said inlet to said motor-air outlet, a sprayer-supply valve port in and through said divider, intermediate the portion of said chamber which is on the air-inlet side of the divider and the portion of said chamber on the other side of said divider, and a valve element carried by said divider in operative juxtaposition to said sprayer-supply valve port and operable by the movement of said divider for controlling the pasage of air from said air inlet to said sprayer outlet, through said divider, a fixed bleeder orifice and a manually variable bleeder orifice intermediate the air-inlet portion of said chamber and said sprayer outlet, a motor-venting valve port between said motor-air outlet and the atmosphere, and a valve in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of said sprayer is closed, and said motor-supply valve and sprayer-supply valve being opened and said motor-vent valve being closed by said divider when the air-control valve of said sprayer is open.

6. A pneumatic control for operative connection with and use intermediate (a) a source of compressed air, (b) a liquid sprayer which disperses liquid with the aid and under the influence of compressed air applied to the liquid leaving the sprayer and including an air-controlled valve for controlling the flow of compressed air therethrough, and (c) the air motor of an air-powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, a spring operatively juxtaposed to said divider and constantly urging said divider towards said air inlet in all positions of said divider, an air outlet from said chamber for connection with the air inlet of said sprayer, said sprayer-air outlet being in free communication with said chamber on the side of said divider opposite to the air-inlet side thereof, an air outlet for connection with the air motor of said air-powered liquid pump adapted to supply liquid to said sprayer, a motor-supply valve port intermediate said motor-air outlet and said air inlet, a movable valve element in operative juxtaposition to said motor-supply valve port and operatively connected with and operable by said divider for controlling the passage of compressed air from said inlet to said motor-air outlet, a sprayer-supply valve port intermediate the portion of said chamber which is on the air-inlet side of the divider and the portion of said chamber on the other side of said divider, and a valve element in operative juxtaposition to said sprayer-supply valve port and operatively connected with and operable by said divider for controlling the passage of air from said air inlet to said sprayer outlet, past said divider, a fixed bleeder orifice and a manually variable bleeder orifice intermediate the air-inlet portion of said chamber and said sprayer outlet, a motor-venting valve port between said motor-air outlet and the atmosphere, and a valve in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of the sprayer is closed, and said motor-supply valve and sprayer-supply valve being opened and said motor-vent valve being closed by said divider when the air-control valve of said sprayer is open.

7. A pneumatic control for operative connection with and use intermediate (a) a source of compressed air, (b) a liquid sprayer which disperses liquid with the aid and under the influence of compressed air applied to the liquid leaving the sprayer and including an air-controlled valve for controlling the flow of compressed air therethrough, and (c) the air motor of an air-powered liquid pump for delivering liquid to said sprayer, said pneumatic control including a housing having a pneumatic chamber therein, an air-pressure-responsive movable chamber divider within said chamber and reciprocable therein, an air inlet through said housing, entering said chamber on one side of said divider, a spring in said housing operatively juxtaposed to and connected with said divider and constantly urging said divider towards said air inlet in all positions of said divider, an air outlet for connection with the air inlet of said sprayer, said sprayer-air outlet being in free communication with said chamber on the side of said divider opposite to the air-inlet side thereof, an air outlet for connection with the air motor of said air-powered liquid pump adapted to supply liquid to said sprayer, a motor-supply valve port intermediate said motor-air outlet and said air inlet, a movable valve element in operative juxtaposition to said motor-supply valve port and operatively connected with and operable by said divider for controlling the passage of compressed air from said inlet to said motor-air outlet, a sprayer-supply valve port through said divider, and a valve element in operative juxtaposition to said sprayer-supply valve port and operatively connected with and operable by said divider for controlling the passage of air from said air inlet to said sprayer outlet through said divider, a fixed bleeder-orifice and a manually-variable orifice intermediate the air inlet portion of said chamber and said sprayer outlet, a motor-venting valve port between said motor-air outlet and the atmosphere, and a valve element in operative juxtaposition to said motor-venting valve port and operatively connected with and operable by said divider to control the flow of air therethrough, said motor-supply valve and said sprayer-supply valve being closed and said motor-vent valve being opened by said divider when the air-control valve of the sprayer is closed, and said motor-supply valve and sprayer-supply valve being opened and said motor-vent valve being closed by said divider when the air-control valve of said sprayer is open.

References Cited in the file of this patent

UNITED STATES PATENTS

| Number | Name | Date |
| --- | --- | --- |
| 1,726,102 | Forman | Aug. 27, 1929 |
| 1,804,751 | Doble | May 12, 1931 |
| 1,998,223 | Czarnecki | Apr. 16, 1935 |
| 2,045,164 | Richards | June 23, 1936 |
| 2,050,041 | Czarnecki | Aug. 4, 1936 |
| 2,248,354 | Jaworowski | July 8, 1941 |
| 2,558,681 | Hachmeister | June 26, 1951 |
| 2,578,102 | Stephenson et al. | Dec. 11, 1951 |